(12) United States Patent
Collacott et al.

(10) Patent No.: US 7,698,304 B2
(45) Date of Patent: Apr. 13, 2010

(54) CACHING DATA IN A DISTRIBUTED SYSTEM

(75) Inventors: David A. Collacott, Sunnyvale, CA (US); Kevin T. Carle, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 140 days.

(21) Appl. No.: 11/276,915

(22) Filed: Mar. 17, 2006

(65) Prior Publication Data

US 2007/0220066 A1 Sep. 20, 2007

(51) Int. Cl.
*G06F 12/00* (2006.01)
(52) U.S. Cl. .................. 707/200; 709/232
(58) Field of Classification Search .............. None
See application file for complete search history.

(56) References Cited

U.S. PATENT DOCUMENTS

| 6,308,327 B1 * | 10/2001 | Liu et al. ............ 725/37 |
| 2002/0059623 A1 * | 5/2002 | Rodriguez et al. ...... 725/91 |
| 2004/0215755 A1 * | 10/2004 | O'Neill .............. 709/223 |
| 2005/0027862 A1 * | 2/2005 | Nguyen et al. .......... 709/225 |
| 2005/0267994 A1 * | 12/2005 | Wong et al. ............ 709/246 |
| 2006/0015637 A1 * | 1/2006 | Chung ................. 709/232 |
| 2006/0031188 A1 * | 2/2006 | Lara et al. ............ 707/1 |
| 2007/0044121 A1 * | 2/2007 | Parekh et al. .......... 725/45 |

* cited by examiner

*Primary Examiner*—Pierre M Vital
*Assistant Examiner*—Truong V Vo
(74) *Attorney, Agent, or Firm*—Lee & Hayes, PLLC

(57) ABSTRACT

A distributed system is described that includes a notification module and multiple data-providing modules for delivering updated data to client devices. The notification module notifies the client devices of a version of the updated data. A client device then requests the identified version of the updated data. In response to the request, the distributed system selects one of the data-providing modules to provide the updated data. The selected data-providing module determines whether it has finished processing the requested version of the updated data. If so, the selected data-providing module provides the updated data; if not, the selected data-providing module rejects the request. If rejected, the client device generates another request, prompting the distributed system to select another data-providing module. The client device continues to generate requests in this manner until a request is accepted, which will eventually happen because all data-providing modules will eventually finish processing the updated data.

13 Claims, 7 Drawing Sheets

CACHING DATA IN A DISTRIBUTED SYSTEM

BACKGROUND

One known architecture for delivering data to client devices comprises a plurality of front-end delivery servers. In response to the receipt of a request for data from a client device, a load balancing module can select one of the delivery servers. The selected delivery server responds by forwarding the data to the client device. This architecture is advantageous because it expedites the processing of requests sent by the client devices. This is because the load created by client requests can be distributed over the plural delivery servers. To further expedite the handling of the requests, the delivery servers can store the data to be delivered in respective caches.

However, the above-described distributed architecture also may pose various technical challenges. For instance, a server system may occasionally update the data that is to be delivered by the plurality of delivery servers. In response to such an update, each of the delivery servers may perform an update operation so that it can send the updated data to the client devices upon request. Different delivery servers may potentially perform this update operation at different rates. As a result, different delivery servers may be ready to send updated data to the client devices at different respective times. This raises a potential problem because the load balancing module may direct a client device's request to a delivery server that has not yet finished performing the update operation. As a result, the client device may potentially fail to receive the most up-to-date data.

For at least the above-identified exemplary reasons, there is a need in the art for more effective distributed architectures and associated techniques for delivering data to client devices.

SUMMARY

The following description sets forth a distributed system and associated techniques for delivering updated data to a plurality of client devices. The system includes an operations center that includes an import module, a plurality of data-providing modules, and a notification module. The import module receives updated data from a source and forwards this data to the plurality of data-providing modules. The data-providing modules store the updated data in respective caches and then forward this data to client devices upon request by the client devices.

To ensure that the most up-to-date data is delivered to client devices upon request, the notification module sends at least one notification message to the client devices which alerts the client devices that at least one of the data-providing units has finished processing the updated data. The notification message includes version information which identifies a version associated with the updated data. A client device can receive the updated data by sending a request to the operations center. The request includes version information which identifies the version of the updated data (as revealed by the notification message). In response to this request, a load balancing module at the operations center routes the request to a selected one of the plurality of data-providing modules. The selected data-providing module determines whether its cache stores data that is ready to be sent that corresponds to the version identified by the request. If this is the case, the selected data-providing module sends the client device the updated data. If this is not the case, the data-providing module rejects the request. If the request is rejected, the client device can generate another request, upon which the load balancing module can select another data-providing module. Through this process, the operations center eventually selects a data-providing module that is ready to send the updated data to the client device. In other words, this process ensures that the data-providing modules do not send "stale" data to the client devices.

In one exemplary implementation, the distributed system and associated techniques are used to provide updated electronic program guide (EPG) data to the client devices.

Additional exemplary implementations and attendant benefits of the distributed system and associated techniques are described in the following.

The subject matter set forth in this Summary section refers to exemplary manifestations of the invention, and hence does not limit the scope of the invention set forth in the Claims section.

Figure 1:
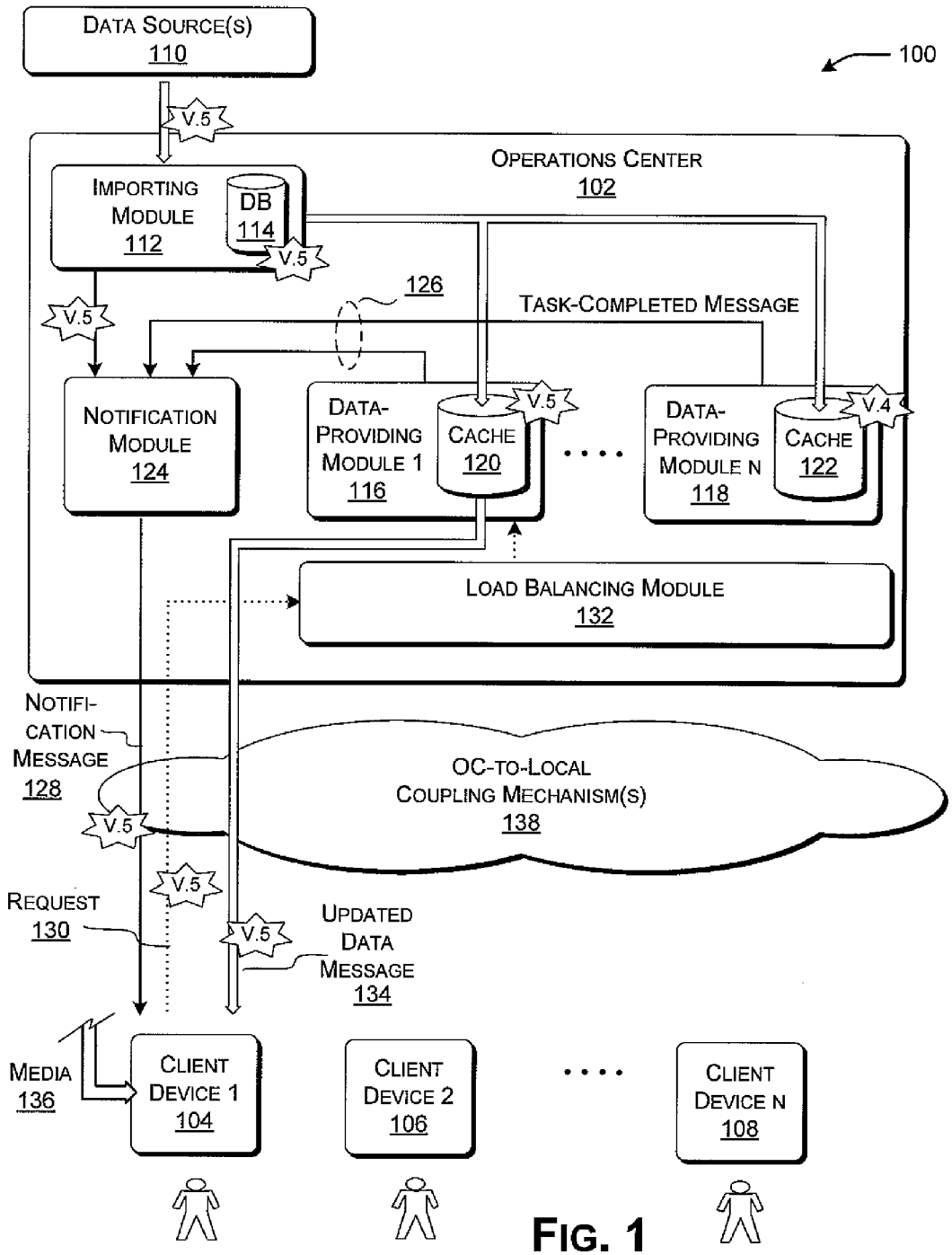
FIG. 1 shows an exemplary distributed system for forwarding updated data from an operations center to a plurality of client devices.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

The following description sets forth a distributed system and associated techniques for delivering updated data to a plurality of client devices. The distributed system conveys version information to the client devices which alerts the client devices to the version of the updated data. The client devices can append this version information to requests for the updated data. The system uses this version information to ensure that the client devices receive the most up-to-date data maintained by the distributed system.

According to one exemplary implementation, the distributed system is used in a media distribution environment. In this environment, an operations center sends media information (such as television programs, movies, music, and so forth) to a plurality of client devices for presentation thereat. In this context, the distributed system can use the techniques described herein to forward electronic program guide (EPG) information to the client devices. Electronic program guide information provides salient information regarding programs that will be aired by one or more content providers. However, the distributed system can use the techniques described herein to forward other kinds of data to the client devices, such as channel map information, and so forth. Channel map information identifies the manner in which different channels are mapped to different respective sources of media information. The distributed system can also be applied to other environments besides media distribution environments.

This disclosure includes the following sections. Section A sets forth an exemplary system for distributing updated data to a plurality of client devices. Section B sets forth exemplary procedures that explain the operation of Section A.

A. Exemplary System (FIGS. 1-4)

Generally, any of the functions described with reference to the figures can be implemented using software, hardware (e.g., fixed logic circuitry), manual processing, or a combination of these implementations. The terms "logic, "module" or "functionality" as used herein generally represents software, hardware, or a combination of software and hardware. For instance, in the case of a software implementation, the term "logic," "module," or "functionality" represents program code that performs specified tasks when executed on a processing device or devices (e.g., CPU or CPUs). The program code can be stored in one or more computer readable memory devices.

More generally, the illustrated separation of logic, modules and functionality into distinct units may reflect an actual physical grouping and allocation of such software and/or hardware, or can correspond to a conceptual allocation of different tasks performed by a single software program and/or hardware unit. The illustrated logic, modules and functionality can be located at a single site (e.g., as implemented by a processing device), or can be distributed over plural locations.

The terms "machine-readable media", "machine-readable storage media", or the like refers to any kind of tangible medium for retaining information in any form, including various kinds of storage devices (magnetic, optical, static, etc.).

A.1. Overview of the System (FIG. 1)

With reference to FIG. 1, a system 100 includes an operations center 102 and a plurality of client devices (104, 106, . . . 108). The operations center 102 forwards updated data to the plurality of client devices (104, 106, . . . 108). In the exemplary scenario emphasized herein, the system 100 pertains to a media distribution environment in which the operations center 102 (or some other entity) forwards media information (such as television programs, movies, music, etc.) to the client devices (104, 106, . . . 108). In this environment, the updated data may comprise electronic program guide (EPG) metadata (referred to below as "data" for brevity). However, as noted above, the system 100 can also be used to disseminate other kinds of media-related data, such as channel map data, and so forth. Further, the system 100 can also be applied to other environments besides media distribution environments.

In a media distribution environment, the operations center 102 can include various modules for acquiring media information, various modules for disseminating the media information to the client devices (104, 106, . . . 108), various modules for handling subscriptions and billing, and so forth. However, as these modules are not the primary focus of this description, FIG. 1 does not depict these modules. In other words, to facilitate explanation, FIG. 1 emphasizes the modules which play a role in distributing the updated data to the client devices.

The various modules in FIG. 1 will be explained below in a generally top-to-bottom fashion. To begin with, data sources 110 represent one or more sources of data. In the terminology used herein, a particular instance of such data is referred to as updated data, meaning that the updated data represents an update of a previously received instance of such data. Consider, for example, the case of EPG data. In this case, the data sources 110 can correspond to one or more commercial sources of EPG data. The data sources 110 can provide such data to the operations center 102 on a periodic basis, such as a once a day. Each new installment of the EPG data constitutes updated data (for update n) because this data presents an update compared to the last installment of EPG data (for update n−1). The data sources 110 can supply such data via any mechanism, such as via the network transfer of data, the physical transfer of a machine readable memory device, and so on.

The operations center 102 includes an importing module 112 for receiving the updated data from the data sources 110. As the name suggests, the role of the importing module 112 is to import the updated data from the data sources 110. The importing process involves storing the updated data in a database 114.

In storing the updated data, the operations center 102 associates version information with the updated data. The version information identifies the version of the updated data. For example, if new updated data is received every day, the operations center 102 can assign different numbers to each respective instance of such data, such as version 1.0 received on February $1^{st}$, version 2.0 received on February $2^{nd}$, and so forth. In the particular scenario illustrated in FIG. 1, the importing module 112 has most recently imported version 5.0 of the updated data, which was preceded by version 4.0 of this data.

The operations center 102 also includes a plurality of data-providing modules (116, . . . 118). One purpose of the data-providing modules (116, . . . 118) is to forward the updated data to the client devices (104, 106, . . . 108) upon request of the client devices (104, 106, . . . 108). To perform this function, each data-providing module (116, . . . 118) performs several operations. According to one operation, the data-providing modules (116, . . . 118) receive the updated data from the importing module 112. For instance, in one implementation, the data-providing modules (116, . . . 118) can periodically inquire as to whether the importing module 112 has received new updated data. If this inquiry is answered in the affirmative, the data-providing modules (116, . . . 118) receive the updated data from the importing module 112. In another implementation, the importing module 110 can forward the updated data to the data-providing modules (116, . . . 118) without being prompted to do so by the data-providing modules (116, . . . 118).

Once new data is received, the data-providing modules (116, . . . 118) then commence processing this data in preparation for sending this data to the client devices (104, 106, . . . 108). This processing may entail, in the case of EPG data, integrating the updated data with previously received data, formatting the data, and so forth. In any event, this processing takes a finite amount of time. Moreover, each data-providing module (116, . . . 118) can potentially perform this processing at different rates, meaning that different data-providing modules (116, . . . 118) may finish this processing at different respective times. At the end of processing, the data-providing modules (116, . . . 118) will have stored the updated data in respective caches (120, . . . 122). Storing the data in the caches (120, . . . 122) is advantageous because it allows the data to be quickly accessed and forwarded to the client devices (104, 106, . . . 108) upon request.

The operations center 102 also includes a notification module 124. The purpose of the notification module 124 is to notify the client devices (104, 106, . . . 108) that the operations center 102 has received new updated data. To perform this function, the notification module 124 receives task-completed messages 126 from the data-providing modules (116, . . . 118). Each task-completed message 126 informs the notification module 124 that an associated data-providing module (116, . . . 118) has finished processing the updated data, and thus this data-providing module (116, . . . 118) is ready to send this data to the client devices (116, . . . 118). As stated above, different data-providing modules (116, . . . 118) may process the updated data at different rates, and thus different data-providing modules (116, . . . 118) can be expected to generate respective task-completed messages 126 at different times. The receipt of a task-completed message 126 is a trigger which prompts the notification module 124 to send a notification message 128 to the client devices (104, 106, . . . 108). (Note that FIG. 1 shows that the operations center 102 is communicating with representative client device 104; but in actuality, the operations center 102 is also communicating with the other client devices (106, . . . 108)).

The notification message 128 includes version information which identifies the version of the updated data. For instance, if a particular data-providing module (116, . . . 118) has finished processing version 5.0 of the updated data, then this data-providing module (116, . . . 118) will send a task-completed message 126 to the notification module 126, and then the notification module 124 will send a notification message 128 that includes version information that identifies version 5.0.

The notification module 124 can generate notification messages 128 using different protocols. According to one protocol, the notification module 124 can generate a notification message 128 each time it receives a task-completed message 126 from a data-providing module (116, . . . 118). Thus, for instance, if the operations center 102 includes five data-providing modules (116, . . . 118), then, for each import of updated data, the notification module 124 can expect to receive five task-completed messages 126 and generate five notification messages 128 in response thereto. According to another protocol, the notification module 124 can generate a notification message 128 in response to receipt of a first task-completed message 126 that it receives from a data-providing module (116, . . . 118), but will not send out subsequent notification messages 128 in response to the receipt of subsequent task-completed messages 126 from other data-providing modules (116, . . . 118) that pertain to the same version of the updated data. For instance, suppose that the data-providing module 116 finishes processing the updated data corresponding to version 5.0 prior to data-providing module 118. This means that the notification module 124 will generate a notification message 128 upon receipt of a task-completed message 126 from the data-providing module 116, but not upon the receipt of a subsequent task-completed message 126 from the data-providing module 118 (that also pertains to version 5.0). In still another protocol, the notification module 124 can send notification messages 128 on a periodic basis, such as every 30 seconds. These periodic notification messages 128 can identify the most recent version that the notification module 124 is aware of (in response to the receipt of task-completed messages 126 from the data-providing modules (116, . . . 118)). Still other protocols are possible. For instance, in other cases, the client devices (104, 106, . . . 108) can periodically request updated data on their own initiative, eliminating the need to send notification messages 128.

After receiving notification messages 128, the client devices (104, 106, . . . 108) can generate request messages 130. The request messages 130 request the operations center 102 to forward the updated data to the client devices (104, 106 . . . 108). Different protocols can govern the manner in which the request messages 130 are generated. In one case, the client devices (104, 106, . . . 108) can generate request messages 130 immediately after receiving the notification messages 128. In another case, the client devices (104, 106, . . . 108) can generate the request messages after receiving the notification messages 130, but only when the client devices (104, 106, . . . 108) actually need the data (such as in response to a user's request for EPG information). In any event, a request message 130 identifies the version information that was conveyed by the notification message 128. The version information identifies the latest version of the data received by the operations center 102.

The operations center 102 also includes a load balancing module 132. The purpose of the load balancing module 132 is to route a request 130 to one of the data-providing modules (116, . . . 118). The load balancing module 132 can be implemented in various ways. According to one implementation, the load balancing module 132 applies conventional considerations to determine which data-providing module (116, . . . 118) should be assigned the task of processing the request 130. For example, the load balancing module 132 can process requests in a round-robin fashion, that is, by looping through a list of data-providing modules (116, . . . 118), assigning consecutive requests to respective consecutive entries in the list.

When a data-providing module (116, . . . 118) is selected, it is asked to satisfy the request 130 by providing the most current version of the updated data. As stated, the most current version is identified by version information appended to the request 130. The selected data-providing module (116, . . . 118) can determine whether it can furnish the requested data by comparing the version information associated with the data stored in its cache (120, . . . 122) with the version information identified by the request 130. If this version information matches, then the selected data-providing module (116, . . . 118) provides the updated data to the requesting client device (104, 106, . . . 108). If, however, the version information does not match, then the selected data-providing module (116, . . . 118) sends a rejection message (not shown) to the requesting client device (104, 106, . . . 108). In response to receiving the rejection message, the requesting client device (104, 106, . . . 108) can generate another request message 130. This prompts the load balancing module 132 to select another of the data-providing modules (116, . . . 118). This process repeats until the load balancing module 132 selects a data-providing module (116, . . . 118) that has finished processing the updated data and can therefore forward the latest version of the updated data to the requesting client device (104, 106, . . . 108).

For example, consider the specific exemplary scenario shown in FIG. 1. In this case, the load balancing module 132 may have first asked the data-providing module 118 to supply version 5.0 of the updated data. Version 5.0 is requested because the notification module 124 has alerted the client devices (104, 106, . . . 108) to the fact that the most current version is version 5.0. However, the cache 122 of this data-providing module 118 has not yet completed its processing of version 5.0 of the updated data, and is therefore not able to send this data to the requesting client device (104, 106, . . . 108). The data-providing module 118 will thus send a rejection message to the requesting client device (104, 106, . . . 108). This may prompt the requesting client device (104, 106, . . . 108) to generate another request message 130. The load balancing module 132 may send this next message 130 to data-providing module 116. This module 116 has indeed completed its processing of the updated data. Therefore, the data-providing module 116 is in position to send the updated data and does so. FIG. 1 illustrates the forwarding of the updated data to the requesting client device (104, 106, . . . 108) as update message 134. Note that the client devices (104, 106, . . . 108) will also receive media information as well; for instance, client device 104 receives media information 136.

The operations center 102 can supply the updated data using different protocols than the protocol described above. For instance, the load balancing module 132 can incorporate intelligence that allows it to proactively determine which data-providing modules (116, . . . 118) have finished processing the updated data. In this scenario, the load balancing module 132 will not ask a data-providing module (116, . . . 118) to send the data if that data-providing module (116, . . . 118) is not yet prepared to send this data.

A coupling mechanism 138 is used to convey information between the operations center 102 and the client devices (104, 106, . . . 108). The coupling mechanism 138 can represent a single mechanism for transporting information or a combination of different kinds of mechanisms. For example, the coupling mechanism 138 can include a cable delivery infrastructure, a terrestrial wireless delivery infrastructure, a satellite wireless delivery infrastructure, and so on. The coupling mechanism 136 can also include any kind of network (or combination of networks), such as a wide area network (e.g., the Internet), an intranet, Digital Subscriber Line (DSL) network infrastructure, and so on. When a network or networks are used, the coupling mechanism 138 can use or involve any kind of protocol or combination of protocols. The networks can include various hardwired and/or wireless links, routers, gateways, name servers, and so on. In the case where DSL infrastructure is used to disseminate information, the coupling mechanism 138 can utilize the services, in part, of telephone coupling infrastructure and DSL processing functionality.

More specifically, the coupling mechanism 138 can accommodate one or more downlink paths and one or more optional uplink paths. One or more downlink paths can be used to send media information 136 to the client devices (104, 106, . . . 108), as well as notification messages 128 and the updated data messages 134. An uplink path can be used to send request messages 130 to the operations center 102. The different paths (128, 130, 134, 136) can be implemented using different physical mechanisms, or by the same mechanism.

In one case, for instance, the operations center 102 can use an IP network to transact all communication between the operations center 102 and the client devices (104, 106, . . . 108). For instance, the operations center 102 can multiplex the data-related messages into a stream of media information 136. Or the operations center 102 can send the data-related messages and the media information 136 in two separate IP paths. In another case, the system 100 can use any kind of conventional delivery infrastructure to deliver the media information 136 itself such as a terrestrial antenna system, a satellite system, a cable system, and so on, and use an IP-based network to send data-related messages. In any scenario that uses IP, the system 100 can use any kind of broadcast or multicast protocol to disseminate the notification messages 128 to the client devices (104, 106, . . . 108), such as the Internet Group Management Protocol (IGMP).

Now referring to the client-side aspects of the system 100, the client devices (104, 106, . . . 108) can be implemented in different ways. A given client device (104, 106, . . . 108) can represent a television set with integral IP interfacing/processing functionality, a television set with an associated set-top box coupled thereto, a digital video recorder DVR) device, a rewritable digital video disc (DVD-RW) device, a personal computer having AV processing functionality, a music playback system, a portable personal media device, a game console, and so forth (as well as any combination of these devices). In whatever manner the client devices (104, 106, . . . 108) are implemented, each these devices can comprise a media processing module that is communicatively coupled to a media presentation module.

A.2. Exemplary Data-Providing Module (FIG. 2)

Figure 2:
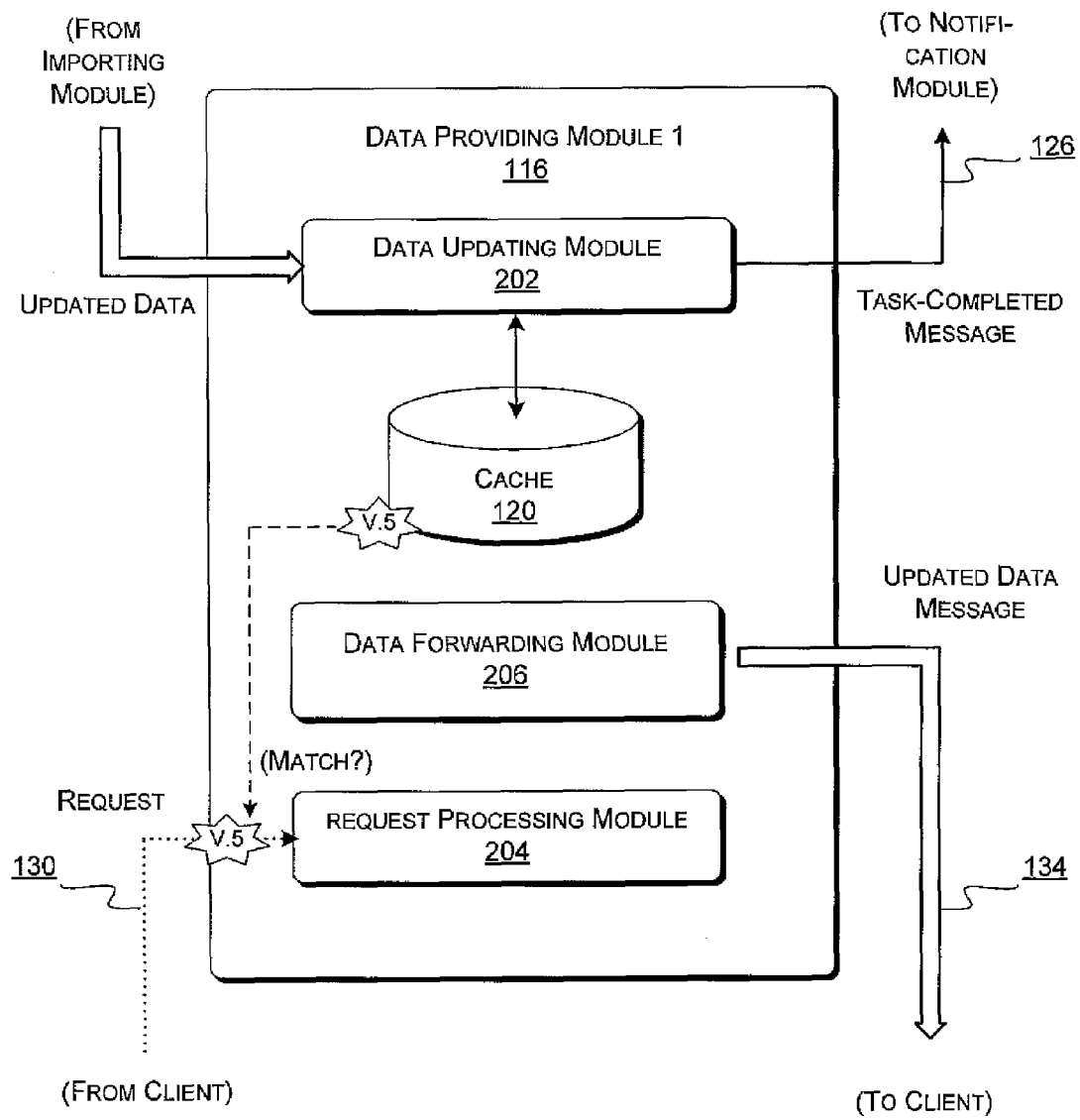
FIG. 2 shows an exemplary data-providing module for use in the system of FIG. 1.

FIG. 2 provides additional details regarding one of the data-providing modules (116, . . . 118), namely the data-providing module 116.

The data-providing module 116 includes a data updating module 202. The data updating module 202 receives updated data from the importing module 112 and stores the updated data in the cache 120. The data updating module 202 can perform this task in different ways. In one implementation, the data updating module 202 can periodically query the importing module 112 to determine whether it has received new updated data. If this is the case, the data updating module 202 receives the new updated data from the importing module 112. As previously stated, the processing performed by the data updating module 202 takes a finite amount of time, and different data-providing modules (116, . . . 118) can potentially finish this processing task at different respective times. When the data updating module 202 is finished processing the updated data, it sends a task-completed message 126 to the notification module 112.

The data-providing module 116 also includes a request processing module 204. The request processing module 204 receives a request 130 sent by a client device (104, 106, . . . 108). Recall that the request 130 includes version information which identifies the version of the updated data. The request processing module 204 operates by comparing the version information identified by the request 130 with the version information associated with the updated data stored in the cache 120. If the version information matches, then the request processing module 204 determines that it is appropriate to send updated data in response to the request 130. If the version information does not match, then the request processing module 204 sends a rejection message indicating that it is not ready to send the updated data in response to the request 130. For example, the request processing module 204 may determine that the data updating module 202 is still in the process of processing the updated data, so that cache 120 presently stores updated data corresponding to version 4.0, or that the cache 120 is in some intermediate state.

Finally, the data-providing module 116 includes a data forwarding module 206. As the name suggests, the purpose of the data forwarding module 206 is to forward the updated data stored in the cache 120 to the client device (104, 106, . . . 108) which sent the request 130.

A.3. Exemplary Client Device (FIG. 3)

Figure 3:
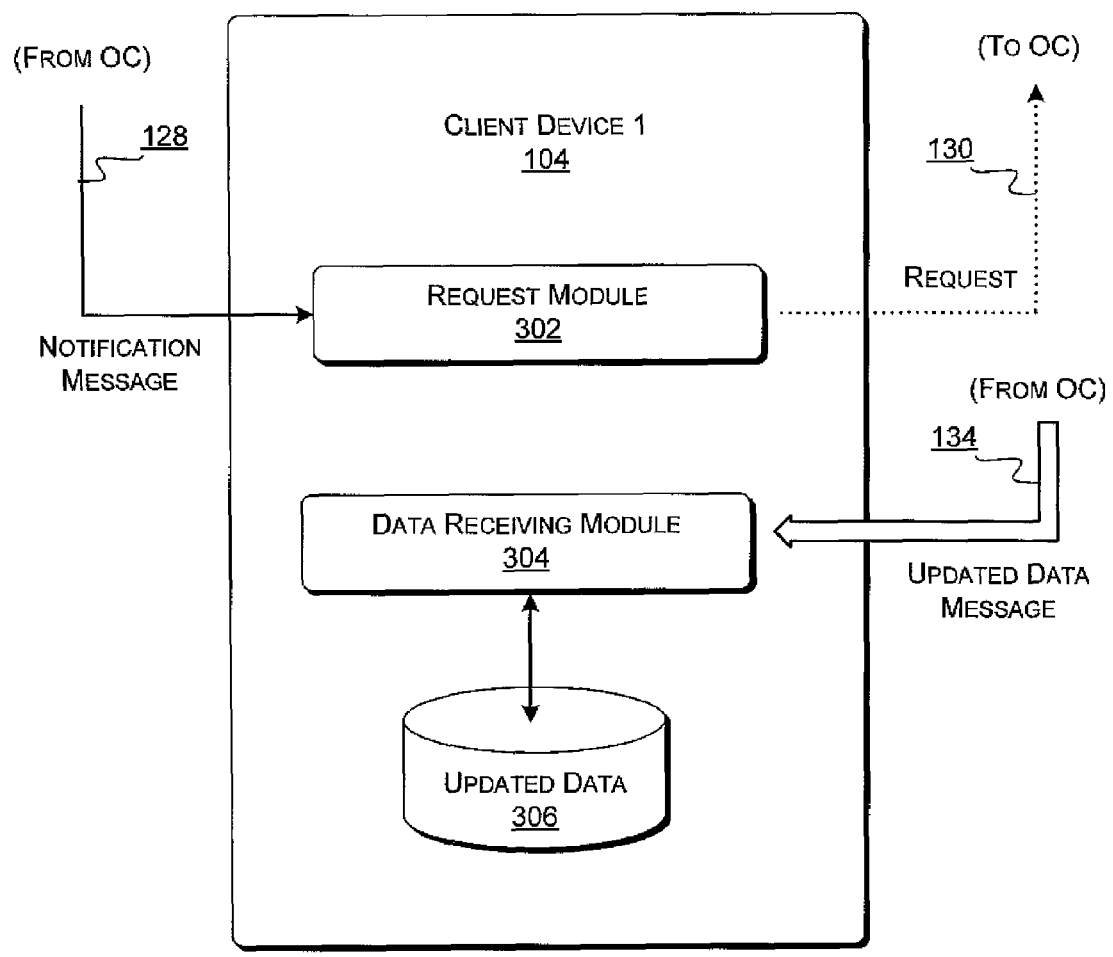
FIG. 3 shows an exemplary client device for use in the system of FIG. 1.

FIG. 3 provides additional details regarding one of the client devices (104, 106, . . . 108), namely the client device 104. To facilitate explanation, FIG. 3 only shows the components of the client device 104 which are pertinent to the updating operations featured herein.

The client device 104 includes a request module 302. The request module 302 receives the notification message 128 from the notification module 124. The notification message 128 reflects the fact that at least one of the data-providing modules (116, . . . 118) has finished processing the updated data, but perhaps not all of the data-providing modules (116, . . . 118) have finished processing the updated data. In response to this message 128, the request module 302 generates a request 130 for the updated data. In one implementation, the request module 302 can generate the request 130 immediately after receiving the notification message 128. In another implementation, the request module 302 can generate the request 130 in an on-demand fashion, that is, when this data is needed (e.g., in response to a request from the user). Recall that the notification message 128 includes version information which identifies the version of the updated data. The request module 302 includes the version information in the request 130 that it generates. The request 130 is either successful (resulting in the transfer of updated data to the client device 104) or unsuccessful (resulting in the receipt of a rejection message). In the latter case, the request module 302 can generate another request 130.

The data-providing module 110 includes a data receiving module 304. The data receiving module 304 receives the updated data message 134 from the operations center 102 and stores this data in an updated data store 306. In one case, the client device 104 can use the updated data in the store 306 each time it needs this data (e.g., each time it needs to display EPG data). In an alternative, on-demand, case, the client device 104 can download the updated data from the operations center 102 (using the procedure described above) each time that it needs this data.

Figure 4:
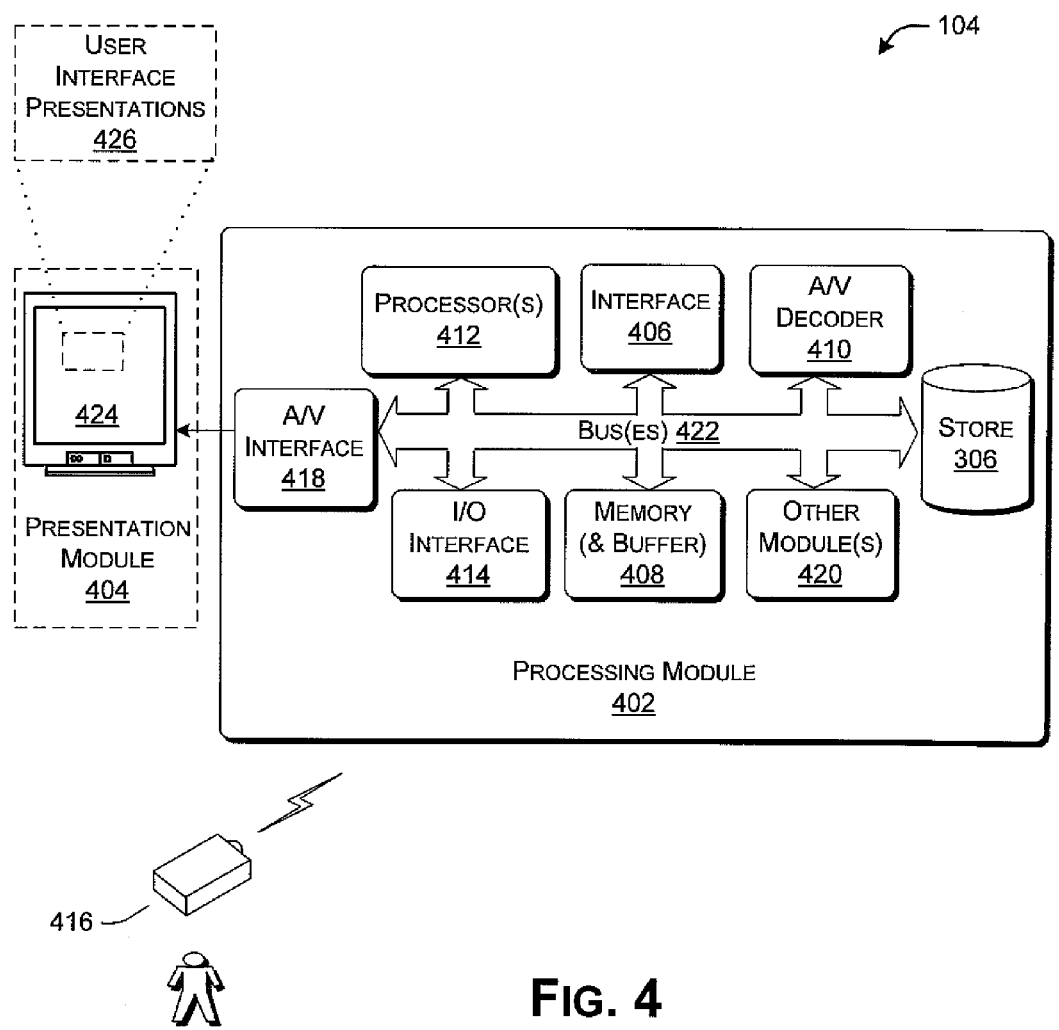
FIG. 4 shows exemplary data processing equipment for use in the system of FIG. 1.

A.4. Exemplary Processing Equipment (FIG. 4)

As explained above, a given client device (104, 106, . . . 108) can represent a television set with integral IP interfacing/processing functionality, a television set with an associated set-top box coupled thereto, a digital video recorder (DVR) device, a rewritable digital video disc (DVD-RW) device, a personal computer having AV processing functionality, a music playback system, a portable personal media device, a game console, and so forth (as well as any combination of these devices). FIG. 4 provides additional details regarding generic processing hardware that can be used to implement the client device 104.

The client device 104 comprises a media processing module 402 coupled to a media presentation module 404. The media processing module 402 performs various processing operations on information. The media presentation module 404 presents the results of the processing performed by the media processing module 402. In general, the type of client device 104 shown in FIG. 4 is tailored to the processing of a stream of digitized media information received via a network. However, the data updating techniques disclosed herein can also be used in conjunction with systems in which the client device 104 receives media information via other, more conventional routes, such as a terrestrial-based antenna system, a cable distribution system, a satellite distribution system, and so forth.

The media processing module 402 can include a number of modules for performing its ascribed tasks. To begin with, the media processing module 402 includes a network interface module 406. The network interface module 406 can represent any functionality for receiving media information from the operations center 102 using any coupling mechanism. For example, the network interface module 406 can comprise an Ethernet NIC, a DSL modem, a cable modem, a wireless network interface, or other kind of network interface equipment. The network interface 406 can also be used to receive notification messages 128 from the operations center 102, to transmit requests 130 to the operations center 102, to receive updated data from the operations center 102, and so forth. In an alternative implementation, the processing module 402 can include two or more different types of interface mechanisms (not shown) for implementing different kinds of communication paths.

The media processing module 402 also includes memory 408. A portion of the memory 408 can comprise program instructions for implementing the various modules (302, 304) shown in FIG. 3.

The media processing module 402 also includes an audio-visual (AV) decoder 410 for decoding (and decompressing) the received media information into its video and audio components. Decoding comprises ordering packets (if received out of order), extracting media information from the stream of received packets, and also extracting timing information that will govern the playback of the media information.

The media processing module 402 also includes one or more processors 412 for executing instructions to implement the functionality of the media processing module 402.

The media processing module 402 also includes an I/O interface 414 for interacting with the user via one or more input devices, such as a remote controller 416, a personal computer (not shown), a joy stick (not shown), a voice recognition mechanism (not shown), and so forth.

The media processing module 402 also includes an A/V interface module 418 for providing media information in an appropriate format to the media presentation module 404.

The media processing module 402 also includes the above-identified local store 306 for storing recorded programs and other data.

Finally, the media processing module 402 can include various other modules 420, not specifically identified by name in the figure. For instance, the media processing module 402 can include a graphics compositor for combining a video component of the media information from the AV decoder 410 on a frame-by-frame basis with graphics information. The graphics information may comprise various user interface presentations which are overlaid on the media information. One particular type of graphics presentation is an EPG-type graphics presentation. An EPG-type graphics presentation informs the user of salient information regarding programs that are scheduled for presentation by the operations center 102.

Finally, one or more busses 422 communicatively couple the above-identified components together.

The media presentation module 404 can comprise any kind of device for presenting AV information, including a CRT-type device, an LCD-type device, a plasma-type display device, a projection-type display device, and so forth. In any case, the media presentation device 404 defines a display surface 424. The media processing module 402 can present one or more user interface presentations 426 on the display surface 424, including the EPG-type graphics presentation.

As a final note, although not shown, the operations center 102 can be implemented by one or more server-type computers and/or other processing equipment. For instance, in one case, the different data-providing modules (116, . . . 118) can be implemented by respective server-type computers, and the notification module 124 can be implemented by another server-type computer. Although not shown, these computers or equipment can have a basic architecture which is similar to that illustrated in FIG. 5, namely, comprising processors, memory, various interfaces, various buses, and so on.

Figure 5:
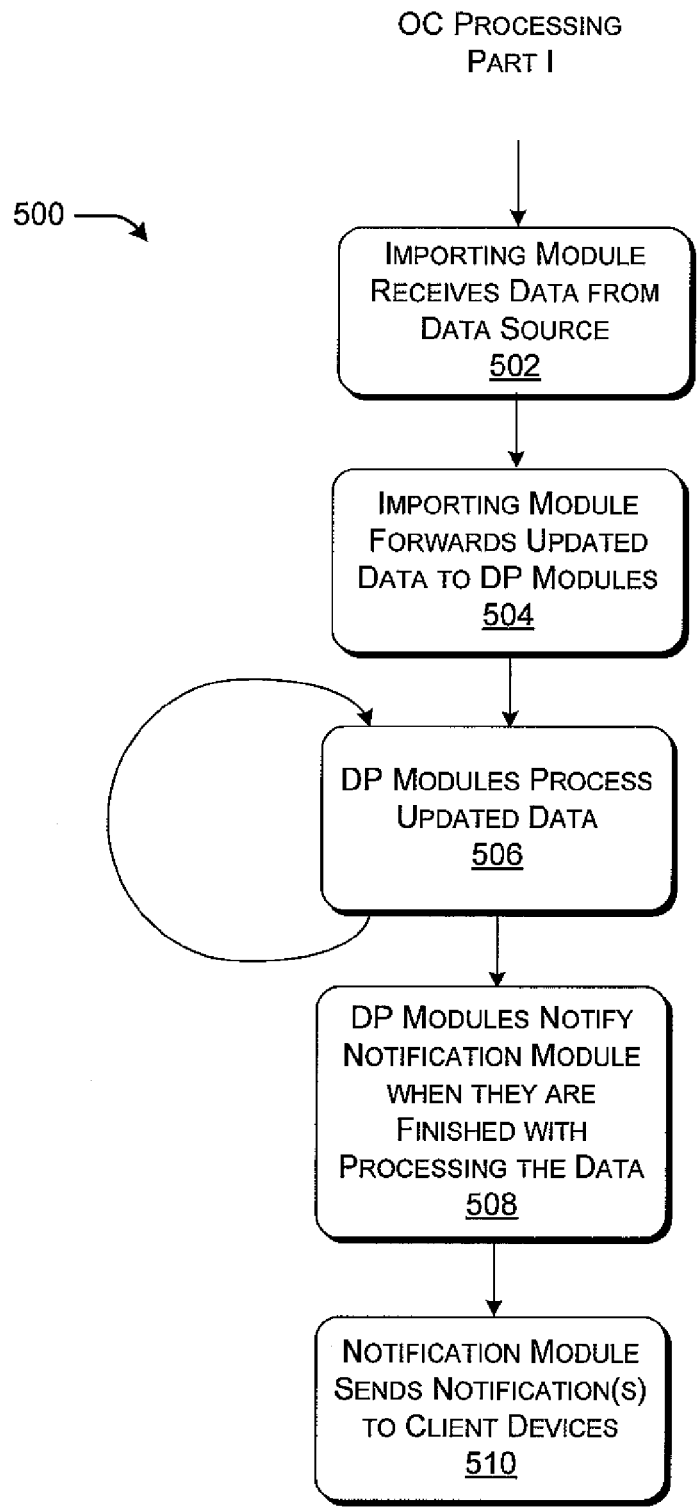
FIGS. 5 and 6 show an exemplary manner of operation of the operations center of FIG. 1.
Figure 6:
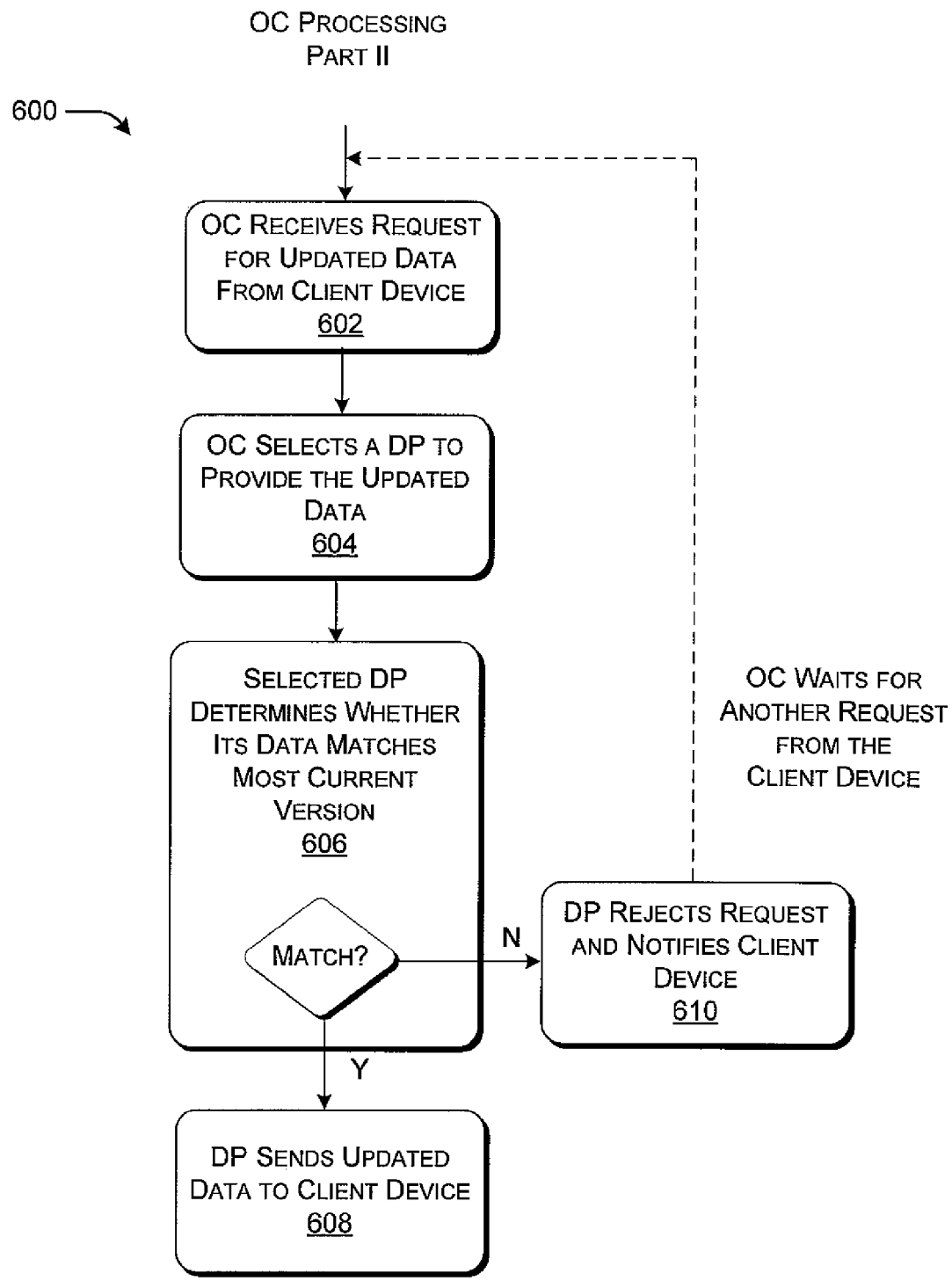
Figure 7:
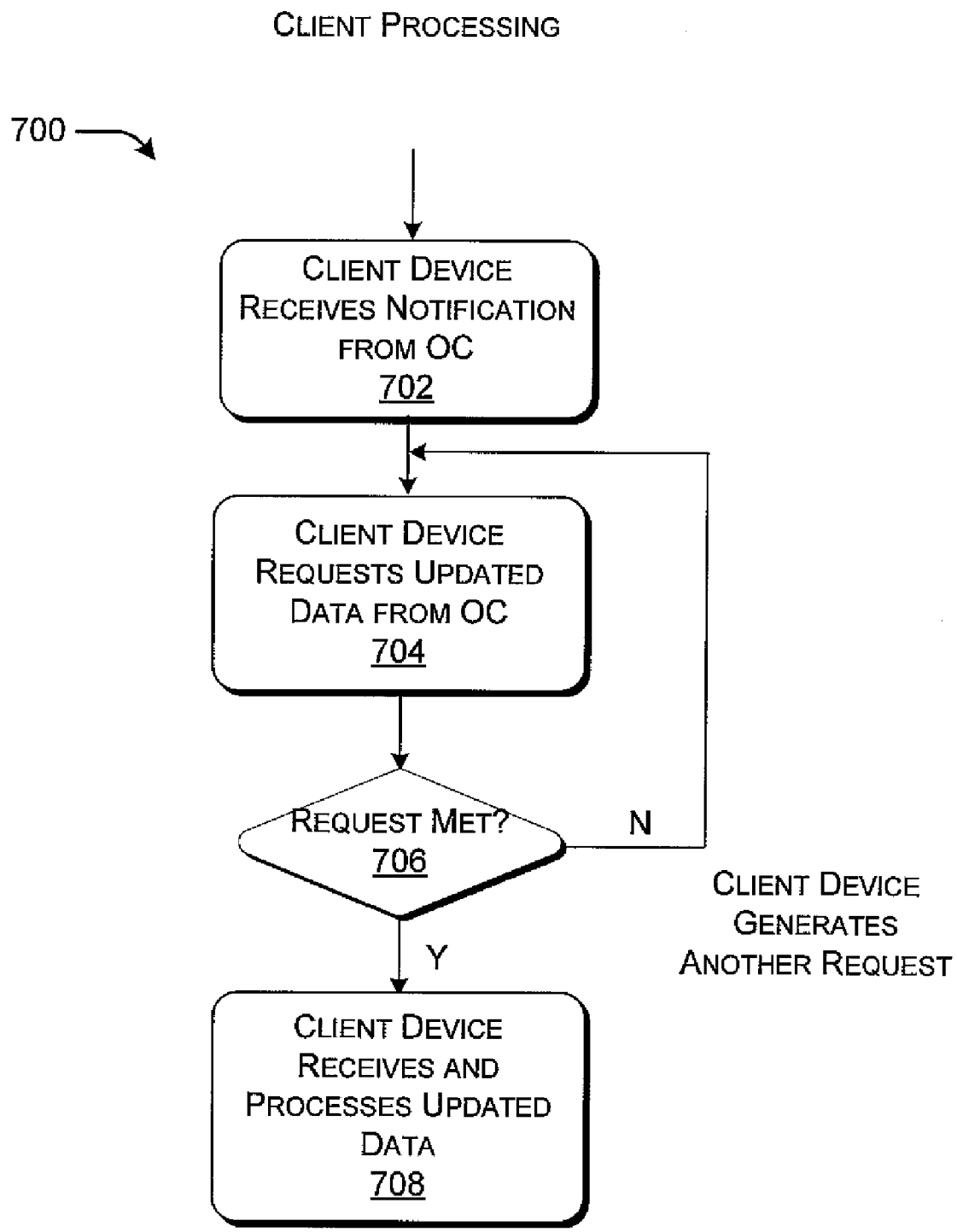
FIG. 7 shows an exemplary manner of operation of a client device of FIG. 1.

B Exemplary Method of Operation (FIGS. 5-7)

FIGS. 5-7 describe the operation of the system 100 in flowchart form. To facilitate discussion, certain operations are described as constituting distinct steps performed in a certain order. Such implementations are exemplary and non-limiting. Certain steps described in these flowcharts can be grouped together and performed in a single operation, and certain steps can be performed in an order that differs from the order shown in the flowcharts. As the functions described in these flowcharts have already been explained in prior sections, Section B will serve primarily as a review of those functions.

B.1. Exemplary Operation Center Processing (FIGS. 5 and 6)

FIG. 5 shows a procedure 500 used by the operations center 102 to send notification messages 128 to the client devices (104, 106, ... 108).

In block 502, the importing module 112 receives updated data from the data sources 110. For instance, the receipt of this updated data may reflect a daily receipt of EPG data from a commercial source of this data.

In block 504, the importing module 112 forwards the updated data to the data-providing (DP) modules (116, ... 118). In one implementation, the data-providing modules (116, ... 118) can periodically poll the importing module 112 to determine whether it has imported new updated data; if so, the importing module 112 can respond by sending the data-providing modules (116, ... 118) the updated data.

In block 506, each of the data-providing modules (116, ... 118) processes the received imported data. This processing culminates in the storage of the updated data in the caches (120, ... 122) of the data-providing modules (116, ... 118).

In block 508, each data-providing module (116, ... 118) sends a task-completed message 126 to the notification module 124 to alert the notification module 124 to the fact that it has finished processing the updated data. Different data-providing modules (116, ... 118) can process the updated data at different rates; thus, different data-providing modules (116, ... 118) may finish this updating operation at different times.

In block 510, the notification module 124 sends a notification message 128 to the client devices (104, 106, ... 108). The notification message 128 alerts the client devices (104, 106, ... 108) to the fact that at least one of the data-providing modules (116, ... 118) has finished the update process. The notification message 128 includes version information which identifies the version of the updated data, such as version 5.0 according to the scenario described above.

FIG. 6 shows a procedure 600 used by the operations center 102 to process requests 130 sent by the client devices (104, 106, ... 108).

In block 602, the operations center 102 receives a request 130 from a client device (104, 106, ... 108) for the updated data.

In block 604, the load balancing module 132 of the operations center 102 selects one of the data-providing modules (116, ... 118) to process the request. The load balancing module 132 can perform this task in any fashion, such as by selecting the data-providing module (116, ... 118) using a round-robin protocol or other type of protocol.

In block 606, the selected data-providing module (116, ... 118) determines whether it is prepared to send the client device (104, 106, ... 108) the requested version (e.g., version 5.0) of the updated data. The data-providing module (116, ... 118) can perform this task by determining whether the version information associated with the data stored in its cache (120, ... 122) matches the version information identified by the request 130.

In block 608, in the event of a match, the data-providing module (116, ... 118) sends updated data to the client device (104, 106, ... 108) which has requested this data.

In block 610, in the event of a non-match, the data-providing module (116, ... 118) sends a rejection message to the client device (102, 104, ... 106) which requested the data. The rejection message may prompt the client device (102, 104, ... 106) to generate another request, upon which the load balancing module 132 will select another data-providing module (104, 106, ... 108). FIG. 6 represents the receipt of one or more subsequent requests by a dashed line that connects block 610 to the start of the process in block 602.

The procedure 600 shown in FIG. 6 is just one of many possible procedures that can be used to process requests sent by the client devices (104, 106, ... 108). In another procedure (not shown), the load balancing module 132 has knowledge of data-providing modules (116, ... 118) that can provide the requested version of the updated data, or can interrogate the data-providing modules (116, ... 118) to find out this information. In this scenario, the load balancing module 132 can forward the request to a data-providing module (116, ... 118) which is known to be capable of providing the updated data. This eliminates the need to send a rejection message to the requesting client device (104, 106, ... 108). This likewise eliminates the need for the requesting client device (104, 106, ... 108) to send repeated requests for the updated data. Still other protocols are possible.

B.2. Exemplary Client Device Processing (FIG. 7)

FIG. 7 shows a procedure 700 used by a client device (104, 106, ... 108) to receive updated data from the operations center 102.

In block 702, the client device (104, 106, ... 108) receives the notification message 128 from the notification module 124. The notification message 128 includes version information which identifies the version of the updated data.

In block 704, the client device (104, 106, ... 108) sends a request 130 to the operations center 102, which requests updated data having the version identified in the notification message 128.

Block 706 reflects the fact that the request 130 is either successful or unsuccessful. If the request 130 is successful, in block 708, the client device (104, 106, ... 108) receives and stores the updated data. If the request is not successful, the client device (104, 106, ... 108) receives a rejection message from the operations center 102. Upon receiving the rejection message, the client device (104, 106, ... 108) has the opportunity of generating another request, as indicated by the "N" branch of FIG. 7.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for providing updated data to a plurality of client devices, comprising:

receiving updated electronic program guide (EPG) data from a source;

providing the updated EPG data to a plurality of data-providing modules for integrating the updated EPG data with previously received EPG data;

sending a notification message from a notification module to at least one client device that identifies a version of the updated EPG data in response to receiving a task-completed message at the notification module from one of the plurality of data-providing modules, the task-completed message sent when the one of the plurality of data-providing modules has finished integrating the updated EPG data, wherein the notification module generates a notification message in response to receipt of the task-completed message received from the data-providing module and does not send out subsequent notification messages in response to receipt of subsequent task-completed messages identifying the same version of undated EPG data from other data-providing modules;

receiving a request from one of the plurality of client devices for the version of the updated EPG data identified in the notification message, wherein the plurality of client devices are configured for presentation of media information;

in response to the request, routing the request to one of the data-providing modules that has finished integrating the version of the updated EPG data identified in the request; and sending the updated EPG data to the requesting client device from one of the data-providing modules that received the request, wherein the request comprises a first request and a second request, and wherein the routing comprises:

choosing a candidate data-providing module in response to the first request, wherein the choosing the candidate data-providing module is performed by a load balancing module that incorporates an intelligence allowing the load balancing module to proactively determine which of the plurality of data-providing modules is ready to deliver EPG data that matches the version of the updated EPG data identified in the first request by interrogating the plurality of candidate data-providing modules to identify the candidate data-providing module that has finished integrating the version of the updated EPG data identified in the request;

determining whether the candidate data-providing module is ready to deliver EPG data which matches the version identified in the first request, to provide a matching result;

selecting the candidate data-providing module as the selected one of the plurality of data-providing modules if the matching result indicates a match;

when the matching result does not indicate a match by comparing the version identified in the first request with a version associated with data stored in a cache of the candidate data-providing module, notifying the at least one client device that the first request has failed;

receiving the second request from the client module;

choosing an other candidate data-providing module in response to the second request; and repeating the determining and selecting with respect to the other candidate data-providing module.

2. The method of claim 1, wherein the providing of the updated EPG data comprises forwarding the updated EPG data to the plurality of data-providing modules.

3. One or more machine-readable storage media containing machine-readable instructions for implementing the method of claim 1.

4. A computing device comprising:
a processor;
a memory coupled to the processor, the memory comprising logic to implement the method of claim 1.

5. The method of claim 1, wherein the providing updated data to a plurality of data-providing modules further comprises the data-providing modules periodically inquire as to whether an importing module has received the updated data.

6. A method implemented on a computing device by a processor configured to execute instructions that, when executed by the processor, direct the computing device to perform acts for receiving updated data at a client device, comprising:

receiving a notification message at the client device that identifies a version of updated data that is ready to be delivered, wherein the updated data corresponds to electronic program guide (EPG) information and the notification message is generated by a notification module in response to a receipt of a task-completed message from a data-providing module and a subsequent notification message is sent when a subsequent task-completed message indicates there is a new version of the updated data but a subsequent notification message is not sent if the subsequent task completed message indicates the same version dated EPG data from other data-providing modules;

in response to the notification message, sending a request from the client device for the version of updated data identified by the notification message to a load balancing module that incorporates an intelligence allowing the load balancing module to proactively determine which of a plurality of data-providing modules is ready to deliver data that matches the version of updated data identified in the request by interrogating the plurality of data-providing modules to identify a candidate data-providing module that has finished processing the version of the updated data identified in the request; and in response to the request, receiving from a one of the plurality of data-providing modules either the requested version of the updated data or a rejection result;

wherein, in response to receiving the requested version of updated data the updated data is stored on the client device, and in response to receiving a rejection result the client device sends another request for the updated data that also identifies the version of the updated data, as identified by the notification message.

7. One or more machine-readable storage media containing machine-readable instructions for implementing the method of claim 6.

8. A computing device comprising:
a processor;
a memory coupled to the processor, the memory comprising logic to implement the method of claim 6.

9. The method of claim 6, wherein the request is generated in response to a demand from a user.

10. An operations center to provide electronic program guide (EPG) data to a plurality of client devices, comprising:

an importing module to receive a version of EPG data from an external data source and store the EPG data in a database;

a plurality of data-providing modules to receive the EPG data from the database, process the received EPG data in preparation for sending the data to the plurality of client devices, and provide the processed updated EPG data to the plurality of client devices;

a load balancing module to route a request for the EPG data from one of the plurality of client devices to one of the plurality of data-providing modules, wherein the load balancing module incorporates an intelligence allowing the load balancing module to proactively determine which of the plurality of data-providing modules is ready to deliver EPG data that matches the version of updated EPG data identified in the request by interrogating the plurality of data-providing modules to identify a candidate data-providing module that has finished processing the version of the updated data identified in the request;

a notification module to provide a notification message identifying the version of the EPG data received at the importing module to the plurality of client devices, the notification message sent to the plurality of client devices in response to the notification module receiving a task-completed message from a data-providing module, wherein the notification module generates a notification message in response to receipt of the task-completed message received from the data-providing module and does not send out subsequent notification messages in response to receipt of subsequent task-completed messages identifying the same version of undated EPG data from other data-providing modules, wherein each of the plurality of data-providing modules comprises:

a cache to store the EPG data;

logic to process the EPG data;

logic to send the task-completed message to the notification module when processing of the EPG data is finished and the same version of EPG data as that received at the importing module is ready to be delivered to the client device;

logic to receive a request from one of the plurality of client devices routed through the load balancing module for the version of EPG data identified in the notification message;

logic to determine in response to the request, whether the data-providing module has finished the processing of the EPG data received from the database;

logic to send the data to the client device when the data-providing module has determined that the same version of EPG data as that received at the importing module is ready to be delivered; and logic to send a rejection message to the client device when the data-providing module has determined that a version of the EPG data stored in the cache does not match the version of EPG data received at the importing module.

11. One or more machine-readable storage media containing machine-readable instructions for implementing the operations center of claim 10.

12. The method of claim 10, wherein the plurality of data-providing modules periodically inquire as to whether the importing module has received a new version of the data.

13. The method of claim 10, wherein the updated data corresponds to electronic program guide (EPG) information and the processing of the received data comprises integrating the version of the data with a previously received version of the data.

* * * * *